(12) United States Patent
Fernandez

(10) Patent No.: US 10,225,903 B1
(45) Date of Patent: Mar. 5, 2019

(54) LIGHT EMITTING DIODE BULB, CONTROL SYSTEM AND APPARATUS

(71) Applicant: Jose M. Fernandez, Sunrise, FL (US)

(72) Inventor: Jose M. Fernandez, Sunrise, FL (US)

(*) Notice: Subject to any disclaimer, the term of this patent is extended or adjusted under 35 U.S.C. 154(b) by 0 days.

(21) Appl. No.: 15/624,274

(22) Filed: Jun. 15, 2017

Related U.S. Application Data

(60) Provisional application No. 62/350,313, filed on Jun. 15, 2016.

(51) Int. Cl.
*H05B 33/08* (2006.01)
*H05B 37/02* (2006.01)

(52) U.S. Cl.
CPC ....... *H05B 33/0863* (2013.01); *H05B 33/089* (2013.01); *H05B 33/0815* (2013.01); *H05B 33/0827* (2013.01); *H05B 37/0272* (2013.01)

(58) Field of Classification Search
CPC ........... H05B 33/08; H05B 33/0815; H05B 33/0827; H05B 33/089; H05B 33/0863; H05B 37/02; H05B 37/027
See application file for complete search history.

(56) References Cited

U.S. PATENT DOCUMENTS

| | | | |
|---|---|---|---|
| 2009/0296384 A1* | 12/2009 | Van De Ven | H05B 33/0803 362/231 |
| 2011/0279015 A1* | 11/2011 | Negley | F21K 9/137 313/501 |
| 2013/0002167 A1* | 1/2013 | Van de Ven | H05B 33/0815 315/297 |

* cited by examiner

*Primary Examiner* — Thai Pham
(74) *Attorney, Agent, or Firm* — The Concept Law Group, PA; Scott M. Garrett; Scott D. Smiley

(57) ABSTRACT

An LED bulb includes one or more LEDs that have a forward voltage that is dependent on the thermal temperature of the LEDs. In some embodiments the LED bulb includes a temperature sensor that provides an indication of LED temperature to a power supply so that the voltage provided to the LED bulb by the power supply is optimized and adjusted with respect to temperature so that only the voltage needed by the LED bulb to power the LEDs to an desired light output level is provided to the LEDs, and overhead voltage is minimized.

20 Claims, 6 Drawing Sheets

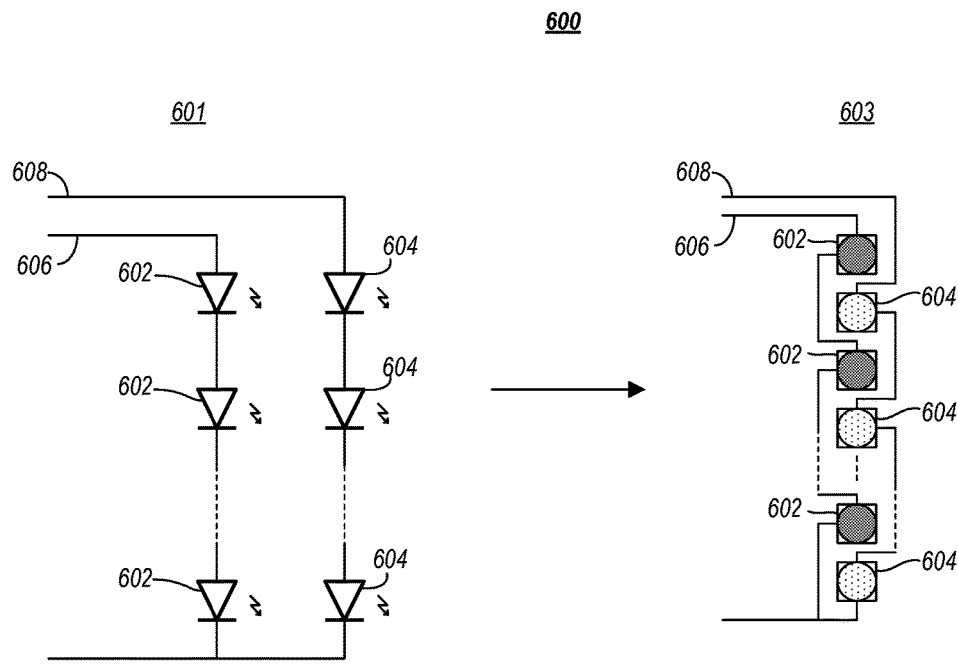
*FIG. 6*
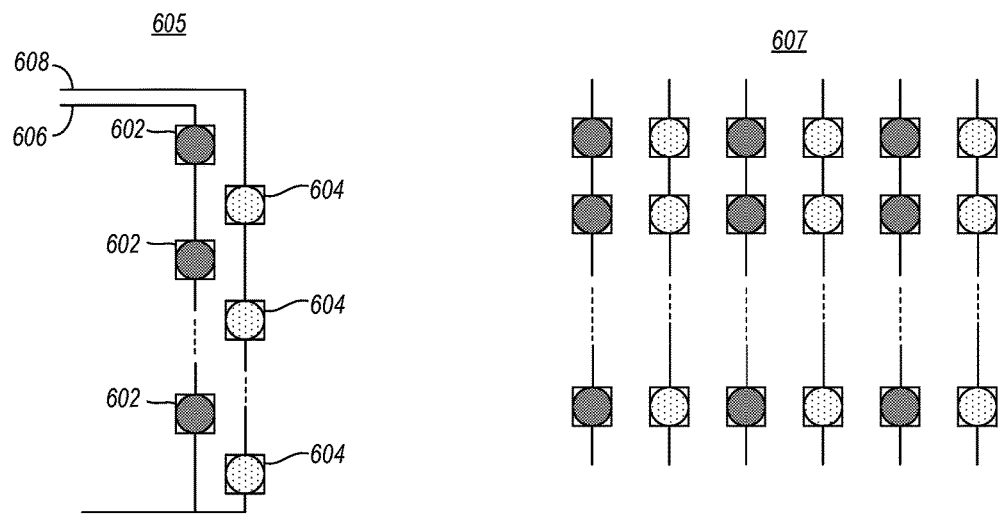
*FIG. 7*
*FIG. 8*

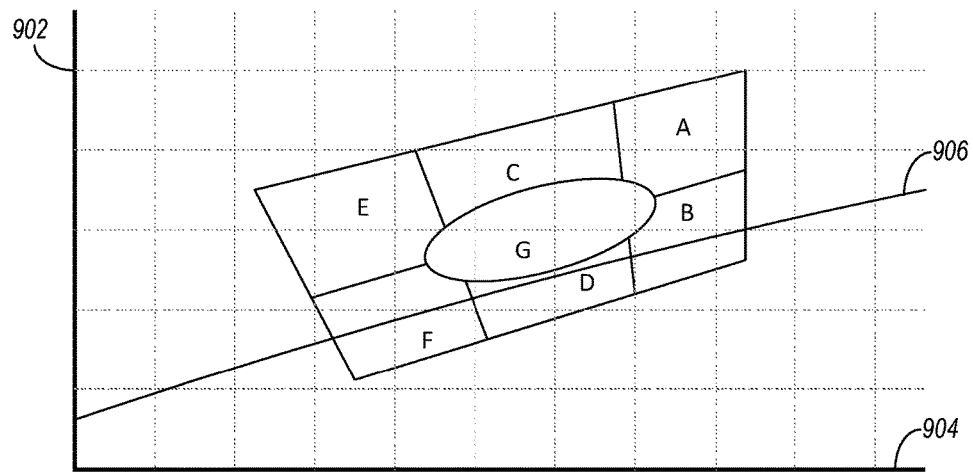
*FIG. 9*
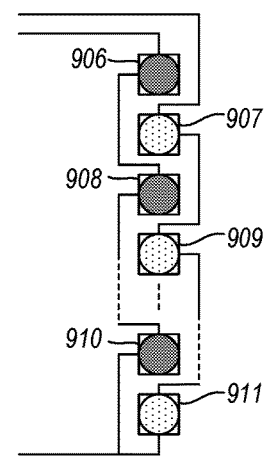
*FIG. 10*
*FIG. 11*

LIGHT EMITTING DIODE BULB, CONTROL SYSTEM AND APPARATUS

CROSS REFERENCE

This application is a non-provisional conversion of, and claims priority to, provisional application No. 62/350,313, filed Jun. 15, 2016, titled "Light Bulb, System, and Method for Optimizing Light Output Efficacy," the entirety of which is hereby incorporated by reference.

FIELD OF THE DISCLOSURE

The present disclosure relates generally to light emitting diode (LED) light bulbs, and more particularly to providing electric current and voltage to an LED light bulb in a way that optimizes the light output efficacy over temperature.

BACKGROUND

LED lighting has become a preferred technology in lighting applications, from home, commercial, and industrial applications, as well as outdoor applications such as street lighting, and stadium and arena lighting, replacing older incandescent lighting systems. LED lights are able to provide lighting at a much higher efficacy than incandescent light bulbs using much less input electric power to output a given level of lumens. Efficacy is a ratio of lumens output by the light bulb to power drawn from a power source, such as a commercial electric utility source, and expressed as lumens per Watt (lm/W). For LED light bulbs, losses in the power conversion circuitry that convert the input power (e.g. commercial 120 VAC) to the direct current (DC) used by the LEDs of the LED bulb are included in the power consumed by the light bulb when determining efficacy according to some industry standards such as those set by the "DesignLights Consortium" to qualify retrofit LED lighting products for efficiency rebates. Many commercial electric energy utility suppliers offer rebate programs in conjunction with governmental agencies to encourage replacement of older lighting sources with new high efficacy lighting sources. To qualify for these rebates, light bulb manufacturers must submit their product for testing to determine whether the products meet the required efficacy standard. Of course, if a manufacturer's product qualify for rebates, they have a substantial market advantage over those that do not.

One of the issues that presents a challenge for manufacturers in meeting rebate standards is the wide range in tolerance of the forward operating voltage of the LEDs. The forward operating voltage is the point at which the light output of the LED is at a specified level. Because of the non-linear nature of LEDs, increasing the current through an LED beyond that needed to achieve the forward operating voltage does not produce a corresponding output in light, and results in wasted power. Manufacturers have two options to deal with the wide tolerance in forward operating voltage.

First, in a series of LEDs, a voltage is applied to the series sufficient to ensure that all of the LEDs will be operating at their forward operating voltage, and because the forward operating voltage of LEDs changes over temperature, the voltage applied must be sufficient to ensure the LEDs all operate at their forward operating voltage over their entire specified/intended operating temperature range. This approach results in significant losses of efficacy because most of the LEDs will have a forward operating voltage that is below the highest end of the forward operating voltage range, meaning those LEDs are simply dissipating excess power as a tradeoff to ensure the few LEDs with high forward operating voltages are turned on (producing light). Using this approach it is not uncommon for LED light bulb manufacturers to use a power source that provides a voltage across a series of LEDs on the order of about 3.42 volts per LED.

A second approach is to sort LEDs by forward operating voltage and select only those LEDs having a forward operating voltage in a much narrower range. This approach allows a more precise voltage level be provided to a series of LEDs to ensure they all reach their forward operating voltage across their operating temperature range, which will be much more uniform among the LEDs than when not selecting/sorting them. However, this approach is costly as each individual LED has to be tested and sorted.

Accordingly, there is a need for an inventive technology that avoids the problems associated with prior solutions and allows for the design and manufacture of LED light bulbs and lighting systems that have a high efficacy without incurring an excessive cost.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

FIG. 6 shows a schematic and a corresponding physical layout diagram of an LED arrangement for an LED bulb that has variable color temperature output, in accordance with some embodiments;

FIG. 7 shows an alternate layout diagram for arranging LEDs, in accordance with some embodiments;

FIG. 8 shows an alternate layout diagram for arranging LEDs, in accordance with some embodiments;

FIG. 9 shows a binning diagram for categorizing LEDs based on the quality of their light output;

FIG. 10 shows a bin selection chart for selecting LEDs for arranging LEDs in a layout, in accordance to some embodiments; and FIG. 11 shows a layout diagram of LEDs that have been selected according to a bin selection chart, in accordance with some embodiments.

Figure 1:
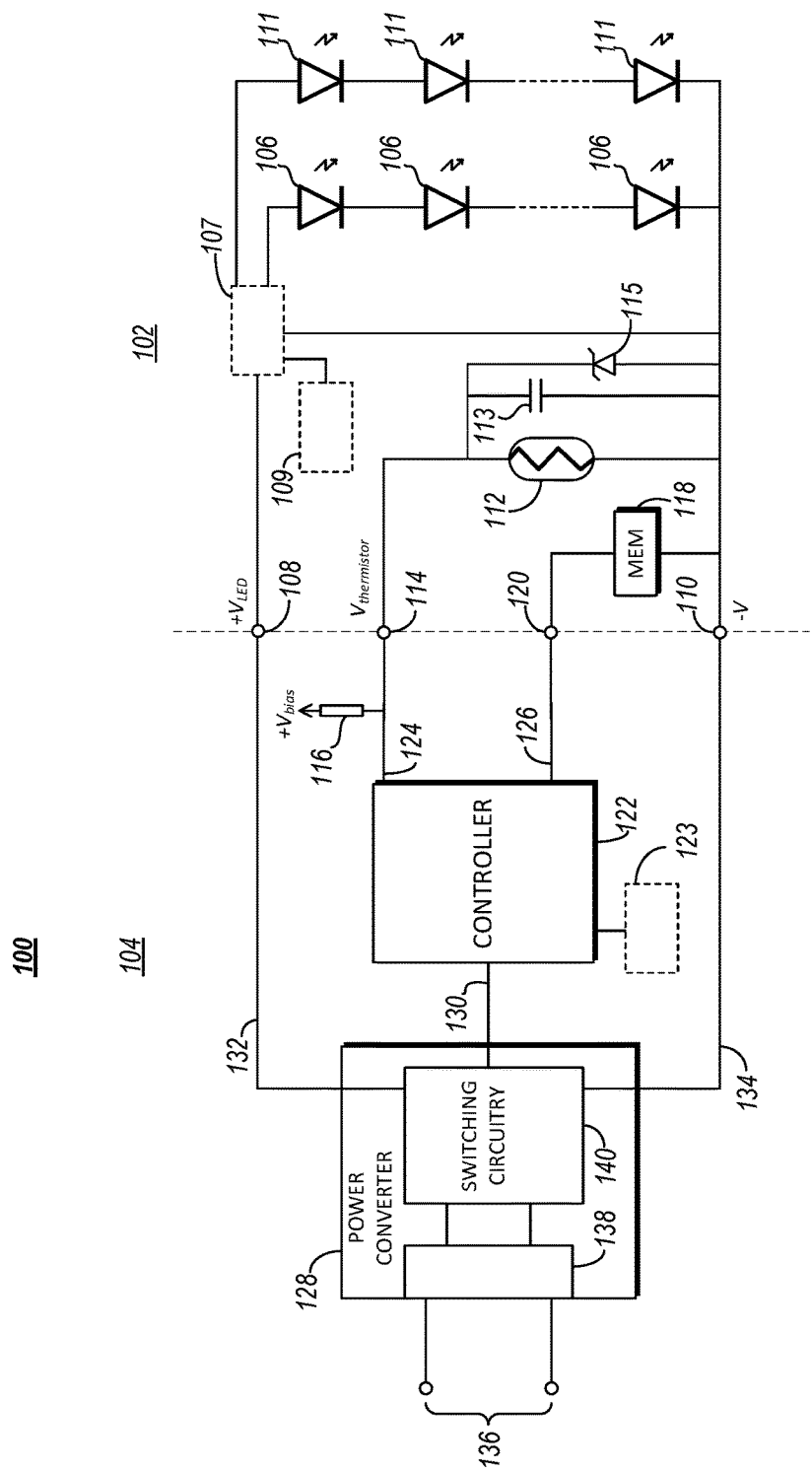
FIG. 1 is a block diagram of a LED lighting system, in accordance with some embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Embodiments of the disclosure include a light emitting diode (LED) bulb having a first series string of LEDs having a first color temperature, and a second series string of LEDs having a second color temperature. Each of the first and second series strings of LEDs have independent power connections, and LEDs of the first and second series strings can be arranged along a line and alternate along the line.

Other embodiments can include light bulb apparatus having at least one LED that has a forward voltage, which varies with temperature, produced by current through the LED(s). Accordingly, there is a forward voltage at which a particular light output efficacy is achieved. The light bulb apparatus can further include a temperature sensor that provides an electrical indication of a present temperature of the LED(s), and a minimum voltage indicator that indicates a minimum voltage to be applied to the LED(s) to achieve the preselected light output efficacy at a nominal temperature.

FIG. 1 is a block diagram of a LED lighting system 100, in accordance with some embodiments. The system 100 includes an LED bulb 102 that is connected to, and powered by, a power supply 104. The LED light bulb 102 includes one or more LEDs 106. When more than one LED 106 is present they can be electrically connected in series so that the same electric current passes through each LED 106. The LED bulb 102 can be a tubular bulb, configured to retrofit into existing fluorescent bulb lighting fixtures. Electric current enters the LED bulb 102 at positive contact 108 and returns via a ground or negative contact 110 and is a direct current (DC) that causes each LED 106 to be biased to at least its forward operating voltage. A regulator circuit 107 may be present to control current through the LEDs 106, the voltage applied across the LEDs, or both. The LED bulb 102 further includes a temperature sensor such as a thermistor 112 that is connected between a thermistor contact 114 and ground 110. The temperature indictor provides a signal at contact 114 indicative of a present temperature of the LED bulb 102. A thermistor 112 is, generally, an electrical resistance having a known negative temperature coefficient. That is, as the thermistor increases in temperature, its resistance value decreases, and vice versa. The thermistor 112 can form a voltage divider with a bias resistor 116 in the power supply 104, and the voltage at the thermistor contact 114 can then indicate a temperature of the thermistor (e.g. by correlating voltage with temperature), which is an indication of the temperature of the LED bulb 102. The LED bulb 102 also includes a baseline voltage indicator 118 that indicates a baseline electric voltage to be applied to the LED or LEDs 106 to achieve a nominal light output level at a nominal temperature. The baseline voltage is the minimum voltage needed to cause all of the one or more LEDs 106 to be at their forward operating voltage for the particular light bulb 102, and may include overhead voltage necessary across a regulator 107 when such a regulator is present. It can be determined by a simple test of applying a voltage to the light bulb across contacts 108, 110 and raising it until all of the LEDs 106 are "on" at their forward operating voltage. At the point the total voltage between contacts 108, 110 is the baseline voltage, and the present temperature of the LED bulb 102 is recorded along with the baseline voltage. The baseline voltage indicator 118 can be a memory in which the baseline voltage and associated temperature are stored. Other information can also be stored in the memory as well, including temperature coefficients or curve data, color parameters that indicate a color of the LEDs 106, flux parameters that indicate a flux of the LEDs 106, and an angle parameter that indicates an angle of the LEDs 106. This information can be accessed by the power supply 104 over a baseline indicator contact 120 that is connected to the baseline voltage indicator 118.

When the LED bulb 102 is connected to the power supply at contacts 108, 110, 114, 120, and the power supply 104 is turned on, or receives a control input indicating the LED bulb 102 is to be turned on, a controller 122 of the power supply 104 can read the present temperature via the thermistor input at an thermistor input 124 that is connected to the thermistor contact 114. The controller also reads the baseline voltage information and other information available, if any, from the baseline indicator, such as memory 118. Upon reading the baseline voltage and present temperature, the controller 122 determines the optimum voltage to be applied across the positive contact 108 and negative contact 110 by the output of a power converter 128. The controller 122 sets the output of the power converter 128 to output the determined optimum voltage via one or more control lines 130. While the LED bulb 102 is being powered, the controller 122 monitors the temperature of the LED bulb 102 via the thermistor 112 (or other thermal indicator), and periodically or occasionally re-determines the optimum voltage based on the present temperature of the LED bulb 102, and adjusts the power converter 128 to the new optimum voltage level if needed. In some embodiments the output of the thermistor at contact 114 can be fed directly to the power converter and used in a control loop to adjust the output voltage of the power supply 104, and the controller 122 can provide an offset signal based on the information in the memory 118 to further adjust the output voltage of the power supply 104 based on the baseline voltage information.

The power converter 128 includes a switching circuitry 140 and input filter and rectifier 138. The power supply 104 can be connected to commercial AC service at power inputs 136. In some embodiments the power supply 104 can alternatively be a power over network arrangement, such as power over Ethernet. The switching circuitry 140 converts the output of the filter and rectifier circuit 138, which is a high raw DC voltage, to a regulated DC output between lines 132, 134, is at the determined optimum voltage for powering the LED bulb 102. Furthermore, because the output voltage that is generated between lines 132, 134 can vary, the switching characteristics of the switching circuitry will likewise vary. As the output voltage of the power supply 104 is changed, if the switching circuitry operates at a fixed switching frequency with a variable duty cycle, as is common, the conducted harmonic distortion that gets fed back to inputs 136, through the filter and rectifier circuit 138 can vary as well. To minimize the effect of varying harmonic distortion, the controller 122, or circuitry in the switching circuitry 140 itself, can vary the switching frequency with output voltage of the power supply 104. That is, as the temperature of the LED bulb 102 changes, the output voltage provided across contacts 108, 110 will have to vary to maintain the LEDs 106 at their forward operating voltage since the forward operating voltage also changes with temperature, thus, the minimum voltage that needs to be supplied to the LED bulb changes with temperature. In changing the output voltage of the power supply 104, the switching circuitry 140 can vary its switching characteristics, including switching frequency, in correlation with its output voltage, in order to minimize output harmonic distortion. Depending on how input power is measured, adjusting the harmonic distortion can affect the measured efficacy of the system 100.

In some embodiments the memory 118 may not be used, and instead, to indicate the baseline parameters, other circuit elements can be used, such as, for example, a capacitor 113, and/or a Zener diode 115. These elements have electrical characteristics that can be detected by the power supply 104. They can be placed in parallel with the thermistor 112 as shown, or provided at their own connection point, such as at contact 120 in place of the memory 118. Various ranges of capacitance, Zener breakdown voltage, resistance, etc. can be used to indicate a baseline voltage for the bulb 102, a temperature profile, etc.

In some embodiments the bulb 102, or power supply 104 can be controlled wirelessly. For example, in bulbs that include the regulator 107, a receiver 109 can be used to receive wireless signals (e.g. radio, optical, acoustic) that are used to adjust the output of the regulator 107 to dim or brighten, for example, the light output by the LEDs 106 by increasing or decreasing current through the LEDs 106. In some embodiments, as described in relation to FIG. 6, the color temperature output of the bulb 102 can be controlled and adjusted as well.

In some embodiments additional LEDs, such as a second series string of LEDs 111 that is electrically in parallel with the first series string of LEDs 106 can be included to achieve variable color temperature light output of the LED bulb 102. The second series string of LEDs 111 is regulated separately from the first series string of LEDs 106, and has its own forward voltage and temperature (thermal) coefficients that can be indicated, for example, in memory 118. Furthermore, the control of the color temperature can be effected in a way that simulates natural light, in real time in correspondence with the time of day to complement the natural circadian rhythm of people exposed to the light produced by the LED bulb 102.

Figure 2:
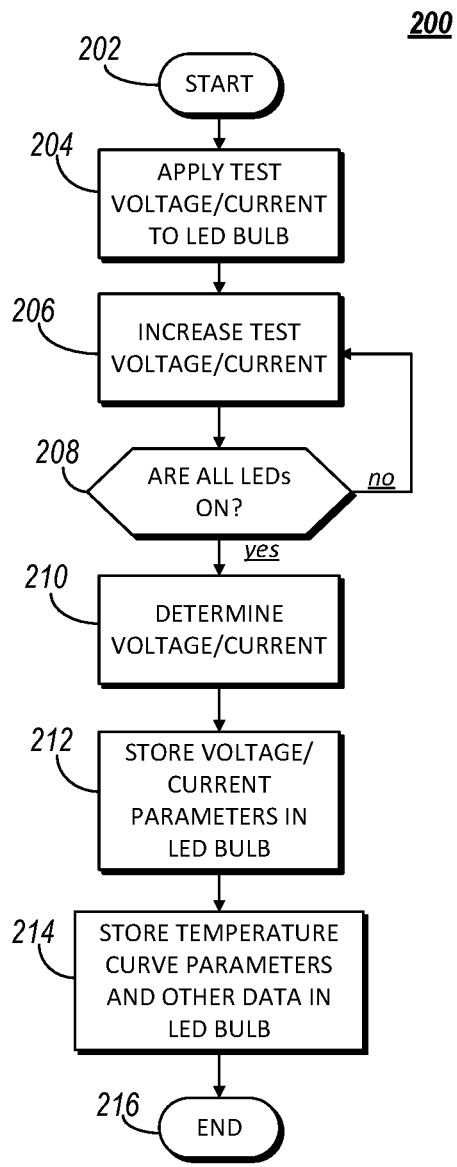
FIG. 2 is a flowchart of a method of manufacturing an LED bulb, in accordance with some embodiments.

FIG. 2 is a flowchart of a method 200 of manufacturing an LED bulb, in accordance with some embodiments. At the start 202, a LED bulb has been fully assembled, and includes one or more LEDs, a temperature sensor, and a baseline voltage indicator. In step 204 a test voltage is applied and adjusted in step 206 until all of the one or more LEDs are operating at a forward operating voltage sufficient to cause the one or more LEDs to output a specified light output (e.g. in lumens) in step 208. Once the LED or LEDs are at their forward operating voltage, then in step 210 the minimum operating voltage for the test temperature is determined. The minimum voltage includes the sum of the forward operating voltages of the LED or LEDs needed to exit step 208 to step 210, as well as any minimum overhead voltage needed to operate any regulator or other electric or electronic circuit in the bulb. In steps 212, 214 the minimum voltage, as determined in step 210, is stored in the baseline voltage indictor (e.g. a memory) as the baseline voltage, along with the test temperature, and other parameters such as temperature coefficients of the LED for forward operating voltage, or other temperature curve data that can be used by the power supply to determine a voltage to be applied to the LED bulb over temperature. Once the information is stored in the LED bulb, the method ends 216 and the LED bulb is ready for use with a power supply such as power supply 104 in FIG. 1.

Figure 3:
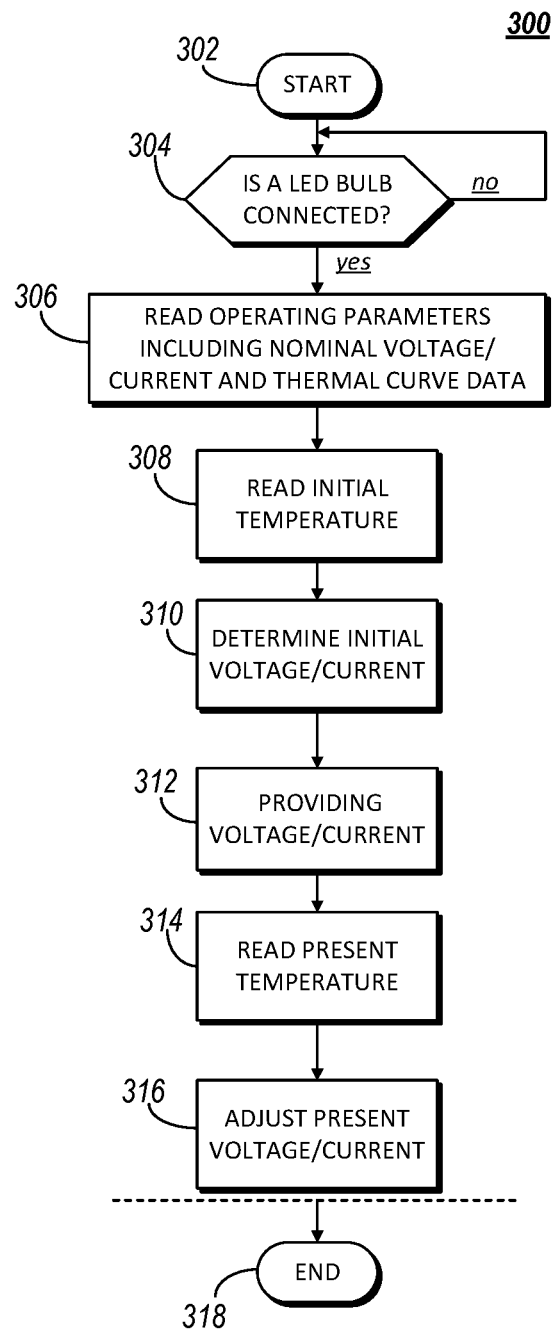
FIG. 3 is a flowchart of a method of operating an LED bulb, in accordance with some embodiments.

FIG. 3 is a flowchart of a method 300 of operating an LED bulb, in accordance with some embodiments. At the start 302 of method 300 the LED light bulb and the power supply to power the light bulb are both ready for operation. In step 304 the power supply determines whether the LED bulb is connected to the power supply. In step 306, once the power supply has detected the LED bulb, the power supply reads the present temperature of the LED bulb via the temperature sensor, and the baseline voltage and temperature information from the memory or other baseline voltage indicator that allows the power supply to adjust its voltage output over temperature of the LED bulb. In step 308 the power supply reads the present temperature of the LED bulb, as indicate by the temperature sensor in the LED bulb. In step 310 the power supply determines or adjusts its voltage output to a voltage level based on the baseline voltage and the present temperature of the LED bulb according to the temperature characteristic of the LEDs of the LED bulb. In step 312 the power supply commences providing the determined or resultant output voltage. In step 314 the power supply reads the present temperature of the LED bulb. This step can be performed continuously, periodically, or occasionally. In step 316 the power supply adjusts the output voltage based on the temperature of the LED bulb. Steps 314 and 316 are repeated, either as discrete steps of continuous processes, until the power supply is turned off, at which point the method ends 318.

Figure 4:
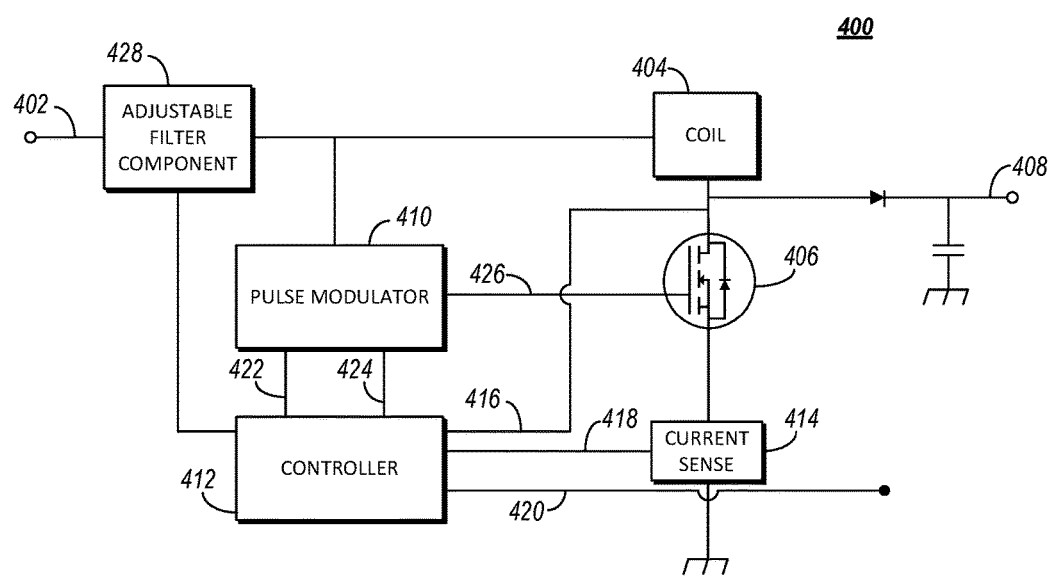
FIG. 4 is a schematic block diagram of a switching circuit that can adjust its operating parameters to optimize total harmonic distortion, in accordance with some embodiments.

FIG. 4 is a schematic block diagram of a switching circuit 400 that can adjust its operating parameters to optimize total harmonic distortion, in accordance with some embodiments. The switching circuit 400 can be similar to that of switching circuitry 140 of FIG. 1, and provides electric power to an LED bulb at a determined voltage and current. Moreover, it adjusts the voltage and current dynamically over temperature, as indicated by the temperature sensor of the LED bulb. In addition, the switching circuit 400 can adjust its operation to not only adjust the output voltage and current, but to also adjust its effect on the harmonic distortion presented to a commercial electric power source as a result of switching operation and/or its input filter. Generally, the power supply receives a commercial AC input, which is rectified and bulk filtered to provide a substantially DC voltage at input 402 that is at a magnitude similar to that of the peak AC voltage. An adjustable filter component 428 can be used to further filter the current and/or voltage provided at the input 402 to a coil 404. The coil 404 can be a winding or windings of a transformer (e.g. a primary winding), or other inductive coil element. Current is switched through the coil 404 by a switching transistor 406 which is controlled by a pulse modulator 410 via switch signal line 426. An output 408 is on the other side of a freewheel diode and bulk capacitor and provides a regulated voltage and/or current to the LED bulb.

The pulse width modulator 410 outputs the switch signal on line 426 using a given duty cycle and switching frequency, and controls the switching transistor 406 to be on (conducting with very low electrical resistance) or off (non-conducting). The pulse width modulator is controlled by a controller or control circuitry 412, which provides frequency and duty cycle control of the pulse width modulator 410 on lines 422, 424, respectively. The controller regulates the output 408 by sensing, for example, a switching voltage on line 416 during non-conduction phases of the switching cycle, and can also monitor current through the switching transistor 406 via a current sense circuit 414 which provides a current sense signal on line 420.

The controller 412, upon powering up the power supply and providing power to the LED bulb, provides voltage based on control information via line 420 from a controller of the power supply (e.g. 122 of FIG. 1), which may incorporate controller 412. As temperature of the LED bulb changes, information on line 420 can indicate to the controller 412 to adjust the output 408 level in order to maintain the proper light output of the LEDs. In order to change the output, in a conventional switching power supply the duty cycle of the pulse modulator's switching signal on line 426 would change, which can still be the case here, but also the switching frequency can change as well to change to harmonic content feeding back to the input 402. The harmonic content can be characterized while designing the power supply, and optimum switching frequencies for different output levels can be determined and programmed into the controller or a memory of the LED bulb (e.g. 118). Furthermore, switching delay of the switch signal on line 426 can be varied with output, and the adjustable filter component 428 can be adjusted with the temperature of the LED bulb as well. In some embodiments, the switching frequency, switching delay, and filter adjustments can be used conjunctively, or over different ranges of temperature of the LED bulb. In some embodiments, when the power to the LED bulb is to be reduced (e.g. due to dimming controls), the duty cycle of the modulator would ordinarily be decreased, conventionally. However, the resulting harmonic distortion resulting from a small duty cycle can fall outside the range of the harmonic filter 428. To avoid that issue, the switching frequency of the pulse modulator can be adjusted to a different frequencies, and as a result, the duty cycle can then be adjusted such that the resulting harmonic distortion at the power output level needed for the desired light output of the LED bulb will be within the range of the harmonic filter 428.

Figure 5:
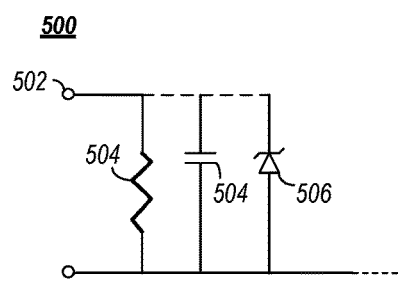
FIG. 5 shows a schematic diagram of a baseline parameter indicator circuit to be used in an LED bulb, in accordance with some embodiments.

FIG. 5 shows a schematic diagram of a baseline parameter indicator circuit 500 to be used in an LED bulb, in accordance with some embodiments. This circuit 500 is an example of a circuit that can be used in place of the memory 118 of FIG. 1 to indicate baseline operating parameters of the LED bulb (e.g. 102) to the power supply (e.g. 104). A bias voltage can be provided by the power supply at a terminal 502. The bias voltage can be static, or it can be variable, meaning the voltage provided through, for example, a series resistor in the power supply, can be adjusted by the power supply, in steps, or more gradually. A resistor 504 can form a resistive voltage divider that causes the voltage at terminal 502 to settle at a preselected DC steady state, indicating, for example, a baseline voltage to be applied to the LED bulb. Alternatively, or additionally, a capacitor 504 can be used. The value of the capacitance can be determined by, for example, stepping the voltage applied to the terminal 502 (e.g. changing it from one DC level to another rapidly), and measuring how long it takes for the voltage at terminal 502 to reach a new steady DC level. The delay time will be related to the capacitance value of the capacitor. Alternatively, or additionally a Zener diode 506 can be used by increasing the voltage at 502 through a pull up bias resistor until the voltage at terminal 502 stops increasing (or starts decreasing if reducing the bias voltage). The Zener breakdown voltage level can likewise be used to indicate a baseline parameter, a temperature profile, etc. All of these electrical parameters (resistance, capacitance, Zener voltage, among others) can be used to cross reference a look-up table in the power supply to determine the baseline parameters to be used in powering the particular LED bulb for optimized efficacy.

FIG. 6 shows a schematic and a corresponding physical layout diagram of an LED arrangement 600 for an LED bulb that has variable color temperature output, in accordance with some embodiments. A schematic circuit diagram 601 corresponds to a physical layout 603 of LEDs in a controllable color temperature LED bulb. In lighting, the color of the light output by a lighting device has been standardized by correlating it with temperature. In particular the color output by "white" light LEDs has been standardized in degrees Kelvin. A 2500K LED, for example, appears to have "cooler" light than a 5000K LED light output. The color temperature of LEDs is dependent upon the process and materials used to manufacture the LEDs. Different color temperatures can be used for different applications, but in some cases people may wish to have variable or controllable color temperature as color temperature of light is perceivable by the human eye, and can affect mood and other psychological states. In particular, it has been found that the color temperature of sunlight influences natural circadian rhythm. Prolonged exposure to unchanging artificial light can negatively affect natural circadian rhythm, leading to insomnia, among other issues.

Accordingly, the LED bulb can be provided with two or more series strings of LEDs having different color temperatures. For example, LEDs 602 can be LEDs having a color temperature of 2500K, while LEDs 604 can have a color temperature of 5000K. Preferably each series string of LEDs 602, 604 are selected to be at opposite ends of a color temperature range so that their outputs can be varied to achieve color temperatures between them. Accordingly, each string of LEDs 602, 604 is powered separately, and variably, at terminals 606, 608, respectively, which are independent power connections to allow each series string to be independently powered. Thus, each string of LEDs can have a different optimum forward voltage level, which is provided by the power supply (e.g. 104) or an on-board regulator (e.g. 107), and by sensing thermal temperature (e.g. via a thermistor), the flux or lumen output can be regulated to a constant level as the temperature of the LEDs 602, 604 changes.

In the physical layout 603 of the LEDs, the LEDs can be arranged in an alternating pattern along a line, suitable for a tubular LED bulb meant to retrofit into, or otherwise replace existing fluorescent tubular bulbs, or in other linear configurations, as well as in matrix layouts with multiple lines like the one shown in 603. In the example of 603, the 2500K LEDs 602 are electrically connected in series, and are interleaved with the 5000K LEDs 604, which are themselves electrically connected in series, as indicated in the schematic circuit diagram 601. Thus, a line of LEDs can be formed having color temperatures 2000K, 5000K, 2000K, 5000K, and so on is formed by alternating and interleaving them. This line pattern can be duplicated in parallel interleaved lines of LEDs with alternating color temperatures to form multiple lines, with each series of LEDs being independently so that the resulting color temperature output can be varied. It will be appreciated by those skilled in the art that the line along which the LEDs are arranged can be a straight line, or it can be arranged along a line in different configurations, such as in a ring or circle, for example.

The effective color temperature of the light produced by the LED bulb using arrangement 600 can be varied by adjusting the current through each string of LEDs 602, 604 between the two color temperatures of the respective LEDs

602, 604. If only LEDs 602 are powered on, for example, the resulting light output will have a color temperature of 2500K. To increase the color temperature of the light output by the LED bulb, then, LEDs 604 can be powered on to mix their 5000K light output with the 2500K light output of LEDs 602. By varying the light output of LEDs 602, 604, then, the total light output of the LED bulb can have a color temperature varying between 2500K and 5000K. Those skilled in the art will appreciate that different color temperature ranges can be selected by selecting LEDs 602, 604 with different color temperatures.

Adjustment of the color temperature output of the LED bulb can be achieved by changing the current through each color temperature string 602, 604 of LEDs. The adjustment can be performed by manually adjusting a control of the regulator providing current to the LEDs 602, 604. In some embodiments control can be achieved using a transmitter to transmit a control signal to a receiver (e.g. 109 or 123) to adjust the current provided to each string of LEDs 602, 604. The control signals can be transmitted using radio protocols, such as WiFi, BlueTooth (IEEE specifications 802.11 and 802.15, respectively), optical or light transmission (e.g. LiFi, infrared), or even acoustic/ultrasonic. Increasing current to LEDs 604 will increase the resulting color temperature of the LED bulb, for example. Likewise reducing the current to LEDs 604 while increasing the current to LEDs 602 results in a cooler color output of the LED bulb. Those skilled in the art will appreciate that, while the example shows two strings, several strings of LEDs having different color temperatures can be used to produce a wider range of color temperature light output, at different lumen levels as well. In some embodiments, intermediate color temperature LEDs can be used. For example, there can be three series strings of LEDs with color temperatures, 2000K, 4000K, and 6000K, and these can be interleaved in straight lines as shown in 603 as well. In the claims where a first and second series strings of LEDs are recited, it should be read as meaning at least a first and second series string, and is not to be limited to just two series strings. The adjustment of the color temperature can be performed over time, in conjunction with the time of day, to simulate natural light and the change in natural light during daytime for circadian rhythm.

FIG. 7 shows another arrangement 605 where LEDs 602, 604 alternate along a line, but are not interleaved on the same line. Together they form one line, though. This pattern can be duplicated (e.g. horizontally on the page) to form a matrix or panel type LED bulb. FIG. 8 shows another arrangement 607 where strings of different color temperature LEDs are alternating horizontally, with the different color temperature LEDs being independently controlled for light output.

FIG. 9 shows a binning diagram for categorizing LEDs based on the quality of their light output. As is well known, in the manufacture of LEDs, the color and flux (light intensity) output of LEDs varies from one to another, even in mass manufacturing in batches of LEDs using the same processes and materials. To ensure that customers get LEDs of similar light quality, LEDs are categorized into bins, or bin categories based on their color and flux. Even within a given color temperature category, for example, there can be noticeable variation is color temperature from one LED to another within the same color temperature grouping. The diagram has a vertical axis 902 and a horizontal axis 904 which represent different light qualities of chromaticity for a given color temperature category. The vertical axis 902 is luminance, and the horizontal axis 904 is based on cone response of the human eye. The binning diagram of FIG. 9 is representative of a binning diagram for LEDs from one manufacturer, and is derived from the chromaticity diagram standardized by the International Commission of Illumination, and known as CIE 1931. The CIE 1931 chromaticity diagram describes color as seen by the human eye in full daylight. The diagram describes color along x and y axes with individual co-ordinates related to a unique color. The CIE 1931 is a 2-dimensional diagram of colors with the same brightness (intensity). The distribution of colors, in reality, is 3-dimensional where the third axis relates to brightness. The 2-dimensional co-ordinates of CIE 1931 are related to specific colors. For example, the co-ordinate 0.3, 0.3 in the CIE 1931 diagram is white light, whereas 0.0082, 0.5384 is greenish cyan and 0.7066, 0.2934 is HeNe laser red. All colors in the visible spectrum are represented on the chromaticity diagram. Experiments in the 1930's and 1940's by the American physicist, David MacAdam, showed there are regions on the chromaticity diagram that contains all colors which are indistinguishable to the color at the center of observation. That is, an ellipse could be drawn around a single point on the chromaticity diagram where, within that ellipse, the human eye cannot distinguish different colors. LED binning according to color is based MacAdam's finding's that humans perceive color within a region, or a concept known as "just noticeable differences". In the CIE 1931 Chromaticity Diagram, a series of boxes are drawn to indicate regions of just noticeable differences. Within each of these individual boxes, the human eye cannot perceive any difference in color. Therefore LED manufacturers indicate the co-ordinates of their LED on the chromaticity diagram and end-users can reliably use this information to achieve the correct color light needed in their application. For white light, the binning categories are close to the black body line 906. The American National Standards Institute has defined parallelograms along the black body line within the CIE 1931 chromaticity diagram for divisions of color temperature. Some manufacturers have defined further subdivisions within the ANSI divisions for particular color temperatures.

In FIG. 9, the binning diagram can be for a color temperature category of, for example, ANSI 6500K. Within the color temperature category are several bin categories labeled "A" through "G," with bin category "G" being a central bin category among the bin categories. Each bin category represents a difference in light quality that can be detected by the human eye, even though they are similar in chromaticity and flux. In order to sort LEDs by bin category, the LEDs must be tested. Different manufacturers may define slightly different bin categories, as well as more of fewer bin categories for a given color temperature. LED bulb and lamp manufacturers tend to choose LEDs from a particular bin for light consistency. A random selection of LEDs from several bin categories can result in one part of the LED bulb having a noticeable difference in light quality from another portion of the LED bulb, which LED bulb manufacturers generally try to avoid. However, LED manufacturers much charge a premium if LED bulb manufacturers only want to buy LEDs of a particular bin category because it leaves them with a surplus of LEDs of other bin categories.

To solve the problem of bin category variation among LEDs, and to alleviate the problem of having to pay a premium price for LEDs of a particular bin category, LEDs of several, or all, of the bin categories are used, but arranged in a particular manner that tends to balance the differences among LEDs overall. FIG. 10 shows a bin selection chart for selecting LEDs for arranging LEDs in a layout, in accordance to some embodiments. The bin selection chart is based on the bin categories "A" though "G" of FIG. 9. The chart plots the same bin categories vertically and horizontally. The chart is meant only as an example to illustrate an inventive principle of selecting LEDs from different bin categories to achieve a balance in the total light output by an LED bulb/lamp. Looking at the binning diagram of FIG. 9, it can be seen that there is a central portion corresponding to bin category "G." In order to avoid one portion of the LED bulb/lamp being perceptibly different in light quality by using LEDs of different bin categories, the chart in FIG. 10 shows how to select successive LEDs in the series string of LEDs. So, for example, if one LED is a bin category "A" then to select the next LED in the physical layout along a line the chart of FIG. 10 indicates that LEDs from bin categories "D" and "G" are acceptable ("2"), and LEDs from bin category "F" is preferred ("1") as the next LED along the line in the physical layout. Looking at the binning diagram of FIG. 9, it can be seen that the "1" and "2" pairings in the chart of FIG. 10 tend to be opposite each other with respect to the center of the binning categories. Here the center is itself a category ("G") but not all binning diagrams of manufacturer's bin categories will have a central bin category defined. Thus, differences in bin categories that traverse the center of the group of bin categories are allowable, while those that do not are avoided.

FIG. 11 shows a layout diagram of LEDs that have been selected according to a bin selection chart, in accordance with some embodiments. LEDs 906, 908, and 910 are LEDs in a first series string of LEDs that are selected from bin categories for a first color temperature, and LEDs 907, 909, 911 are LEDs in a second series string of LEDs that are selected from bin categories for a second color temperature. LEDs of the first and second series strings are interleaved. In the present example, LEDs for the first string of LEDs are selected from bin categories "A" though "G" of FIGS. 9-10. If LED 906 is from bin category "A", then LED 908 is selected to be from bin categories "D," "F," or "G," as indicated in the chart of FIG. 10. Likewise, the selection of LED 910 is then dependent on the bin category of LED 908. The same selection process is applied to the LEDs 907, 909, 911 of the second series string of LEDs. Accordingly, each LED of each of the first and second series strings of LEDs has a bin category based at least in part on a color and a flux of light produced by the LED. The LEDs of each of the first and second series strings are selected from several different bin categories for their respective color temperature, and the LEDs within each of the first and second series strings of LEDs are arranged such that the bin categories of successive LEDs along each series string averages to a central bin category (or equivalently, central location) among the bin categories.

Accordingly, the various inventive embodiments provide the benefit of improving the efficacy of the lighting system that includes an LED bulb and an associated power supply over conventional systems because the output of the power supply does not need to be set to a maximum operating voltage for a worst case temperature condition. Rather, the output can be adjusted based on a present actual temperature of the LED bulb. In some conditions, particularly in climate controlled indoor conditions, for example, the LED bulb can remain relatively cool and operate at a stable temperature. In some outdoor applications the lighting system can be operated in cold temperatures that do not require a maximum output from the power supply. Thus, under many circumstances, the efficacy of the inventive lighting system is improved. Furthermore, the embodiments provide the benefit of an LED bulb having a variable and controllable color temperature that can be selected or dynamically adjusted in order to assist with circadian rhythm.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Furthermore, in several examples herein regulation is shown being performed on the high side of the LEDs. It will be appreciated by those skilled in the art that low side regulation can be performed equivalently.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

I claim:

1. A light emitting diode (LED) bulb, comprising:
   a first series string of LEDs having a first color temperature;
   a second series string of LEDs having a second color temperature;
   wherein the LEDs of the first and second series strings of LEDs have a forward voltage produced by a current through the LEDs at which a particular light output efficacy is achieved, and wherein the forward voltage varies with temperature;
   a baseline voltage indicator configured to provide an indication, to a controller of a power supply configured to provide voltage to the LED bulb, a baseline voltage to be applied to the first series string of LEDs and the second series string of LEDs to achieve the particular light output efficacy at a nominal temperature; and
   a temperature sensor that provides an indication of a present temperature of the LED;
   wherein each of the first and second series strings of LEDs have independent power connections, and wherein LEDs of the first and second series strings are arranged along a line and alternate LEDs of the first and second series strings along the line.

2. The LED bulb of claim 1, wherein each LED of each of the first and second series strings of LEDs has a bin category based at least in part on a color and a flux of light produced by the LED, and wherein the LEDs of each of the first and second series strings are selected from several different bin categories for their respective color temperature, the LEDs within each of the first and second series strings of LEDs are arranged such that the bin categories of successive LEDs along each series string averages to a central bin category among the bin categories.

3. The LED bulb of claim 1, wherein the LEDs of the first and second series strings of LEDs are white light LEDs, and wherein the LEDs of the first series string output white light at a different color temperature than the LEDs of the second series string.

4. The LED bulb of claim 1, wherein the temperature sensor is a thermistor that is coupled between a thermistor contact and a ground contact of the light bulb apparatus.

5. The LED bulb of claim 1, wherein the baseline voltage indicator is a coding resistor having a resistance selected to correspond to the baseline voltage to be applied to the LEDs to achieve the nominal light output level at the nominal temperature according to a predefined set of resistance values, where each resistance value corresponds to a different unique range of electric current.

6. The LED bulb of claim 1, wherein the baseline voltage indicator is a digital memory circuit including parameters to indicate the minimum voltage.

7. The LED bulb of claim 6, wherein the digital memory circuit further includes additional parameters indicating at least one of: a temperature curve of light output over temperature, a color temperature of the first and second series strings of LEDs, a flux of first and second series strings of LEDs, or an angle of the first and second series strings of LEDs.

8. The LED bulb of claim 1, wherein the LEDs of the first and second series strings of LEDs are interleaved along a line.

9. The LED bulb of claim 1, wherein the LEDs of the first and second series strings of LEDs alternate along respective parallel lines.

10. The LED bulb of claim 1, further comprising a radio receiver operable to receive a control signal that causes a regulator in the LED bulb to adjust a current to at least one of the first for second series strings of LEDs.

11. The LED bulb of claim 1, wherein the LED bulb is a tubular LED bulb.

12. A light bulb apparatus, comprising:
   at least one light emitting diode (LED) having a forward voltage produced by a current through the at least one LED at which a particular light output efficacy is achieved, and wherein the forward voltage varies with temperature;
   a temperature sensor that provides an electrical indication of a present temperature of the at least one LED; and
   a memory that includes baseline voltage information indicating a baseline voltage to be applied to the at least one LED to achieve a preselected light output efficacy at a nominal temperature, and temperature information that indicates a thermal response of the at least one LED over temperature.

13. The light bulb apparatus of claim 12, wherein the at least one LED is a plurality of LEDs connected electrically in series.

14. The light bulb apparatus of claim 13, wherein at least one LED is a first series string of LEDs having a first color temperature, the light bulb apparatus further comprises a second series string of LEDs having a second color temperature, wherein the first and second series strings of LEDs each have respectively independent power terminals, and wherein LEDs of the first series string of LEDs are interleaved along a line with LEDs of the second series string of LEDs.

15. The light bulb apparatus of claim 12, wherein the temperature sensor is a thermistor that is coupled between a thermistor contact and a ground contact of the light bulb apparatus.

16. The light bulb apparatus of claim 12, wherein the minimum voltage indicator indicates minimum voltage to be applied to the at least one LED based on a test current applied to the at least one LED to determine the minimum voltage needed to achieve the nominal light output level at the nominal temperature.

17. An light emitting diode (LED) bulb, comprising
a first series string of LEDs having a first forward operating voltage;
a second series string of LEDs having a second forward operating voltage;
wherein each of the first and second series strings of LEDs have independent power connections, and wherein LEDs of the first and second series strings are arranged along a line and alternate along the line;
a temperature sensor that provides an electrical indication of a present temperature of the first and second series strings of LEDs; and
a baseline voltage indicator that indicates a baseline voltage to be applied to each of the first and second series strings of LEDs to achieve a preselected light output efficacy at a nominal temperature.

18. The LED bulb of claim 17, wherein the LEDs of the first series string of LEDs have a first color temperature, and the LEDs of the second series string of LEDs have a second color temperature, and wherein each LED of each of the first and second series strings of LEDs has a bin category based at least in part on a color and a flux of light produced by the LED, and wherein the LEDs of each of the first and second series strings are selected from several different bin categories for their respective color temperature, the LEDs within each of the first and second series strings of LEDs are arranged such that the bin categories of successive LEDs along each series string averages to a central bin category among the bin categories.

19. The LED bulb of claim 17, wherein the temperature sensor is a thermistor.

20. The LED bulb of claim 17, wherein the LED bulb is a tubular LED bulb.

* * * * *